(12) United States Patent
Clines et al.

(10) Patent No.: US 12,443,001 B2
(45) Date of Patent: Oct. 14, 2025

(54) EXTENDABLE SPLICE TRAY

(71) Applicant: PREFORMED LINE PRODUCTS CO., Mayfield Village, OH (US)

(72) Inventors: Cameron Clines, Chagrin Falls, OH (US); Dan Levac, Gahanna, OH (US); Matt Becker, Mentor, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 206 days.

(21) Appl. No.: 17/977,609

(22) Filed: Oct. 31, 2022

(65) Prior Publication Data
US 2023/0138383 A1    May 4, 2023

Related U.S. Application Data

(60) Provisional application No. 63/274,253, filed on Nov. 1, 2021.

(51) Int. Cl.
*G02B 6/44*    (2006.01)

(52) U.S. Cl.
CPC ......... *G02B 6/4455* (2013.01); *G02B 6/4454* (2013.01); *G02B 6/4471* (2013.01)

(58) Field of Classification Search
CPC ... G02B 6/4454; G02B 6/4455; G02B 6/4471
See application file for complete search history.

(56) References Cited

U.S. PATENT DOCUMENTS

| 5,692,299 | A | 12/1997 | Daems | |
|---|---|---|---|---|
| 7,113,687 | B2 * | 9/2006 | Womack | G02B 6/4452 385/134 |
| 7,310,471 | B2 * | 12/2007 | Bayazit | G02B 6/44785 385/137 |
| 7,418,184 | B1 * | 8/2008 | Gonzales | G02B 6/4455 385/134 |
| 10,955,621 | B2 * | 3/2021 | Prevratil | H04Q 1/14 |
| 2004/0256138 | A1 | 12/2004 | Grubish et al. | |
| 2016/0238811 | A1 | 8/2016 | Simmons | |
| 2016/0259129 | A1 * | 9/2016 | Geens | G02B 6/3616 |
| 2022/0397735 | A1 * | 12/2022 | Courchaine | G02B 6/4442 |
| 2023/0096710 | A1 * | 3/2023 | Claessens | G02B 6/4452 385/135 |

FOREIGN PATENT DOCUMENTS

| EP | 3819686 A2 | 5/2021 | |
| WO | WO-2020209983 A1 * | 10/2020 | .......... G02B 6/4454 |
| WO | 2021195371 A1 | 9/2021 | |

OTHER PUBLICATIONS

International Search Report of Corresponding Application No. PCT/US2022/048427; Feb. 28, 2023; 6 Pgs.

* cited by examiner

*Primary Examiner* — Daniel Petkovsek
(74) *Attorney, Agent, or Firm* — Cooper Legal Group, LLC

(57) ABSTRACT

A fiber-optic splice holder. The holder includes a first holder portion that has a first plurality of fiber-optic splice holding locations. The holder includes a second holder portion actuatable with respect to the first holder portion to provide a second plurality of fiber-optic splice holding locations. The holder includes a coupling for connecting the second holder portion to the first holder portion.

26 Claims, 14 Drawing Sheets

EXTENDABLE SPLICE TRAY

RELATED APPLICATION(S)

This application claims priority to provisional application U.S. 63/274,253, filed on Nov. 1, 2021, entitled "EXTENDABLE SPLICE TRAY" which is incorporated by reference herein.

FIELD

The present disclosure relates to fiber-optic splice holders.

BACKGROUND

Elongate lines, and in particular communication optical fibers, extend to a use location. At the use location (e.g., a building, dwelling, or the like), the elongate lines are connected for termination, splicing or the like. Also, for protection (e.g., potential fragileness), neatness, efficiency, etc., splices of optical fibers are retained upon a fiber-optic splice holder. Such holders are often referred to as "trays."

As can be appreciated, each of such holders or "trays" has a finite area upon which fiber-optic splices may be held. If there is a later desire to have a greater number of splices or the like (e.g., such may occur during a system upgrade), a lack of further available space may be experienced.

To address the topic of needed further space, it is possible that a new, larger holder or "tray" may be provided as a replacement. Splices may be transferred to the new, larger holder or "tray" in a common practice called "re-traying." It is to be noted that the process of "re-traying" may be costly and may be a time-consuming process. It is to be noted that the process of "re-traying" may also involve risks of damage, disconnection and the like. Such damage, disconnection and the like may also be associated with disruption of provided service (e.g., communications).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with one or more aspects, the present disclosure provides a fiber-optic splice holder. The holder includes a first holder portion that has a first plurality of fiber-optic splice holding locations. The holder includes a second holder portion actuatable with respect to the first holder portion to provide a second plurality of fiber-optic splice holding locations. The holder includes a coupling for connecting the second holder portion to the first holder portion.

In accordance with one or more aspects, the present disclosure provides a fiber-optic splice holder. The holder includes a first holder portion comprising a first fiber-optic splice holding location, wherein the first holder portion is actuatable with respect to a second holder portion comprising a second fiber-optic splice holding location. The holder includes a coupling for connecting the first holder portion to the second holder portion.

In accordance with one or more aspects, the present disclosure provides a fiber-optic splice holder. The holder includes a first holder portion comprising a first fiber-optic splice holding location, wherein the first holder portion is slidable with respect to a second holder portion comprising a second fiber-optic splice holding location. The holder includes a first segment on the first holder portion to guide the relative sliding.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
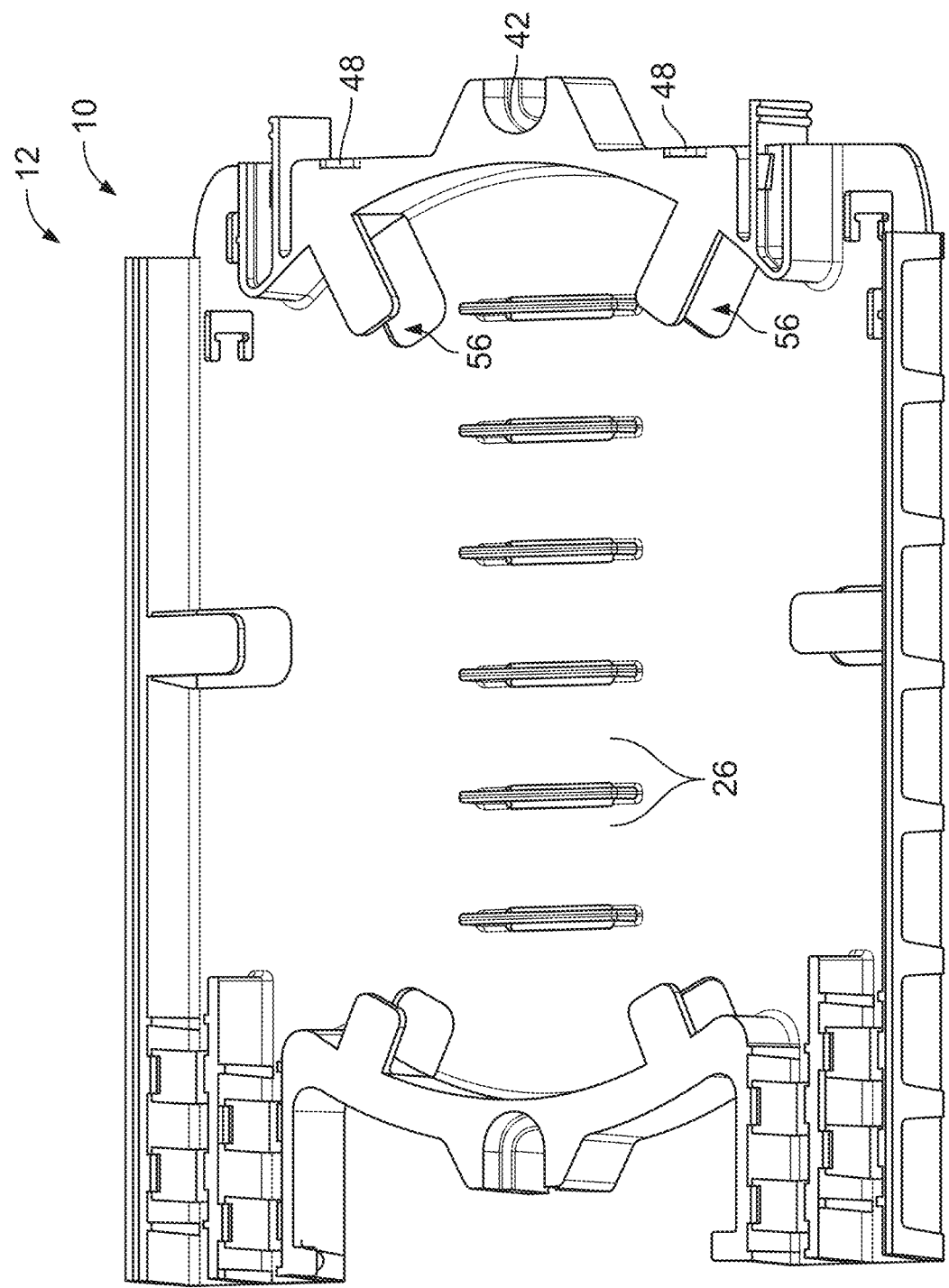
FIG. 1 is a perspective view of an example of a first fiber-optic splice holder portion or "tray" in accordance with at least one aspect of the present disclosure.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

An example first holder portion 10 of a fiber-optic splice holder 12 is shown within FIG. 1. It is to be appreciated that the first holder portion 10 may be considered to be the fiber-optic splice holder 12 (i.e., no other holder portion(s)). However, an aspect of the present disclosure is that the other holder portion(s) may be actuated relative to the first holder portion 10 so that the fiber-optic splice holder 12 has more (i.e., additional) holder portion(s).

Such an example first holder portion 10'/fiber-optic splice holder 12' may be for association with example line(s) 20 (FIG. 2) and placed within a closure, not shown, for protection therein. It is to be appreciated that the example first holder portion 10'/fiber-optic splice holder 12' may have some variation from the example shown within FIG. 1. Such variation simply adds to the understanding that variation is contemplated and within the scope of the present invention.

The fiber-optic splice holder 12 (FIG. 1) (or variant holder 12', shown in FIG. 2) provides a location, safely enclosed within the unshown closure, for holding splices, terminations, connection and the like of elongate fibers of the line(s) 20. It is to be appreciated that structures, such as one or more splice block(s) 22 (see example of FIG. 3), may be included, placed, associated or the like with fiber-optic splice holder 12 (FIG. 1) (or variant holder 12', shown in FIG. 2).

Figure 2:
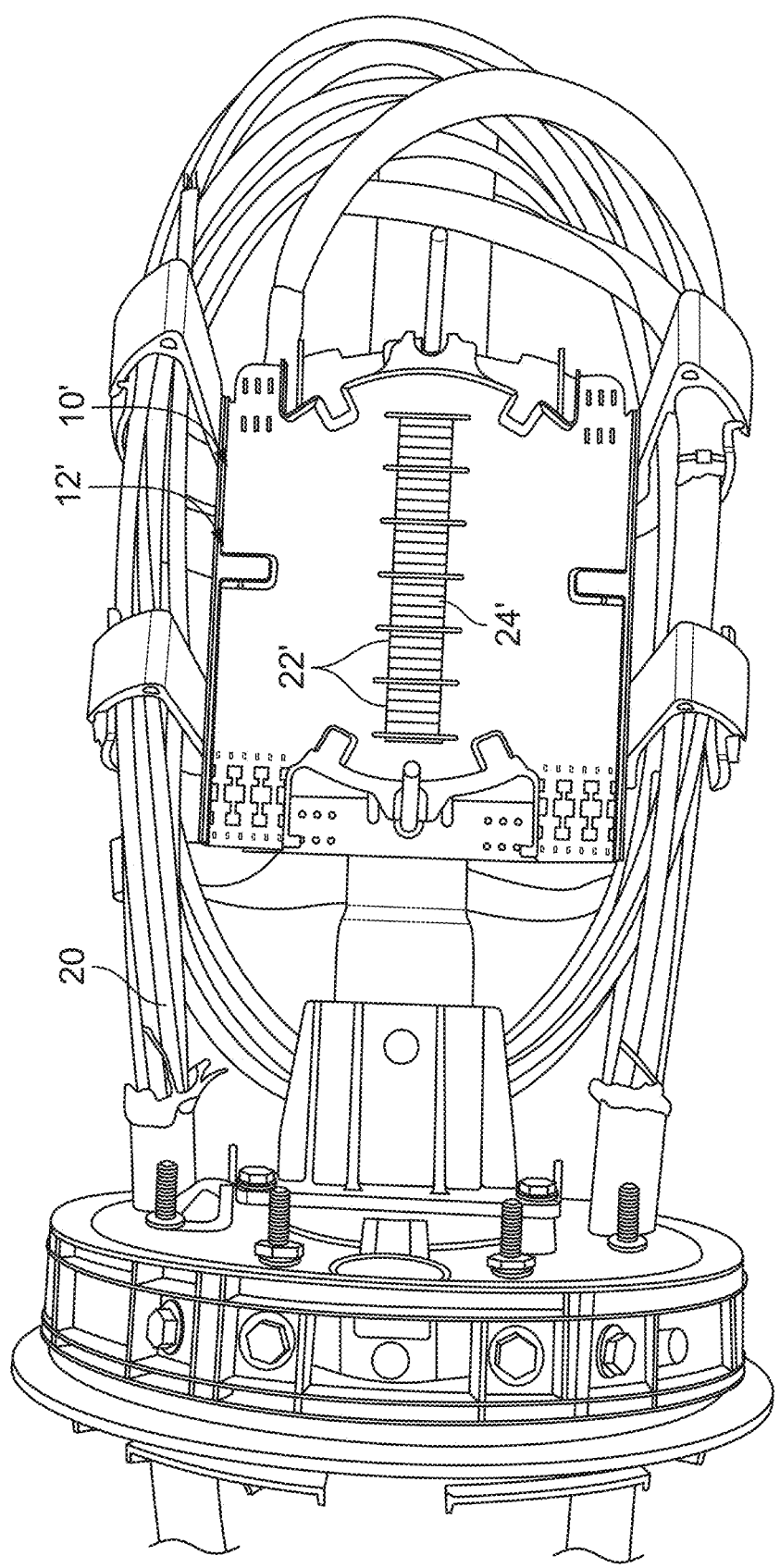
FIG. 2 is a photograph of the example first holder portion of FIG. 1 within an example use environment and shows example lines and related structures.
Figure 3:
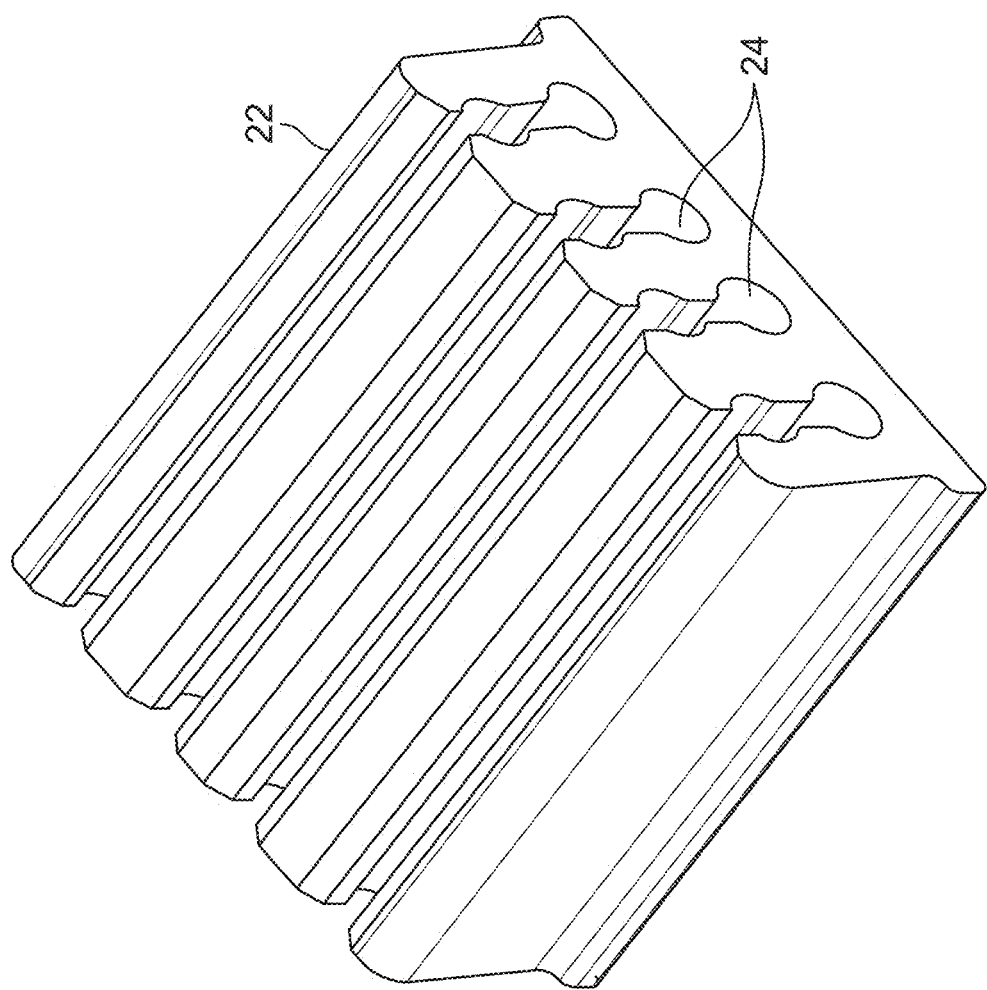
FIG. 3 is perspective view of an example of a splice block that may be used in conjunction with and/or be part of the fiber-optic splice holder portions presented herein.

Within the example splice block 22 shown in FIG. 3, four holder locations 24 are provided. Of course, a different number (e.g., greater or lesser than four) of holder locations may be provided. In fact, it is to be noted that FIG. 2 shows a variant such that a shown example of the splice block 22' each has three holder locations 24'. Such variation simply adds to the understanding that variation is contemplated and within the scope of the present invention.

Turning now to the example first holder portion 10 (e.g., the fiber-optic splice holder 12) of FIG. 1, the first holder portion 10 is configured to have/retain five of such splice blocks 22. Specifically, see the five spaces 26 for the splice blocks 22. As such, a total of twenty holder locations could be provided by the shown example if the splice block 22 of FIG. 3 is utilized at the five available locations and the first holder portion 10 provides the entire fiber-optic splice holder 12. Such is an example of a capacity (i.e., capable of holding twenty). So, the capacity of the example first holder portion 10 may be twenty. Of course, a different number (e.g., greater or lesser than five) of splice blocks is contemplated. In fact, it is to be noted that FIG. 2 shows a variant such that six splice blocks are present. Such variation simply adds to the understanding that variation is contemplated and within the scope of the present invention.

Hereinafter, with the understanding that variants are possible, contemplated and within the scope of the present disclosure, further discussions are presented without the use of alternate reference numerals (i.e., without the added prime, "'"). So, the use of reference numerals without the added prime is to be understood to include all variants.

Figure 4:
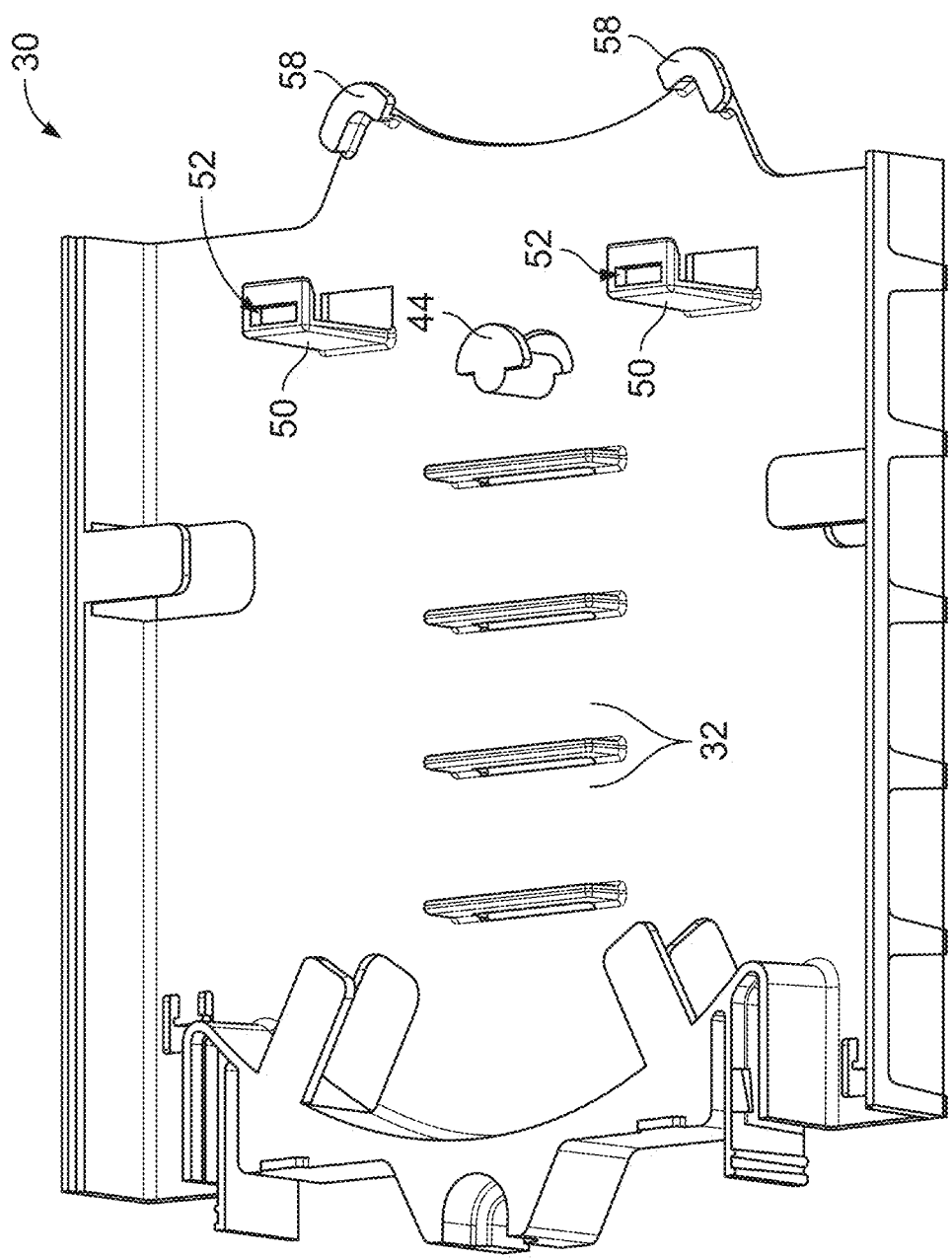
FIG. 4 is a reverse angle perspective view of an example of a second fiber-optic splice holder portion or "tray" in accordance with at least one aspect of the present disclosure.
Figure 5:
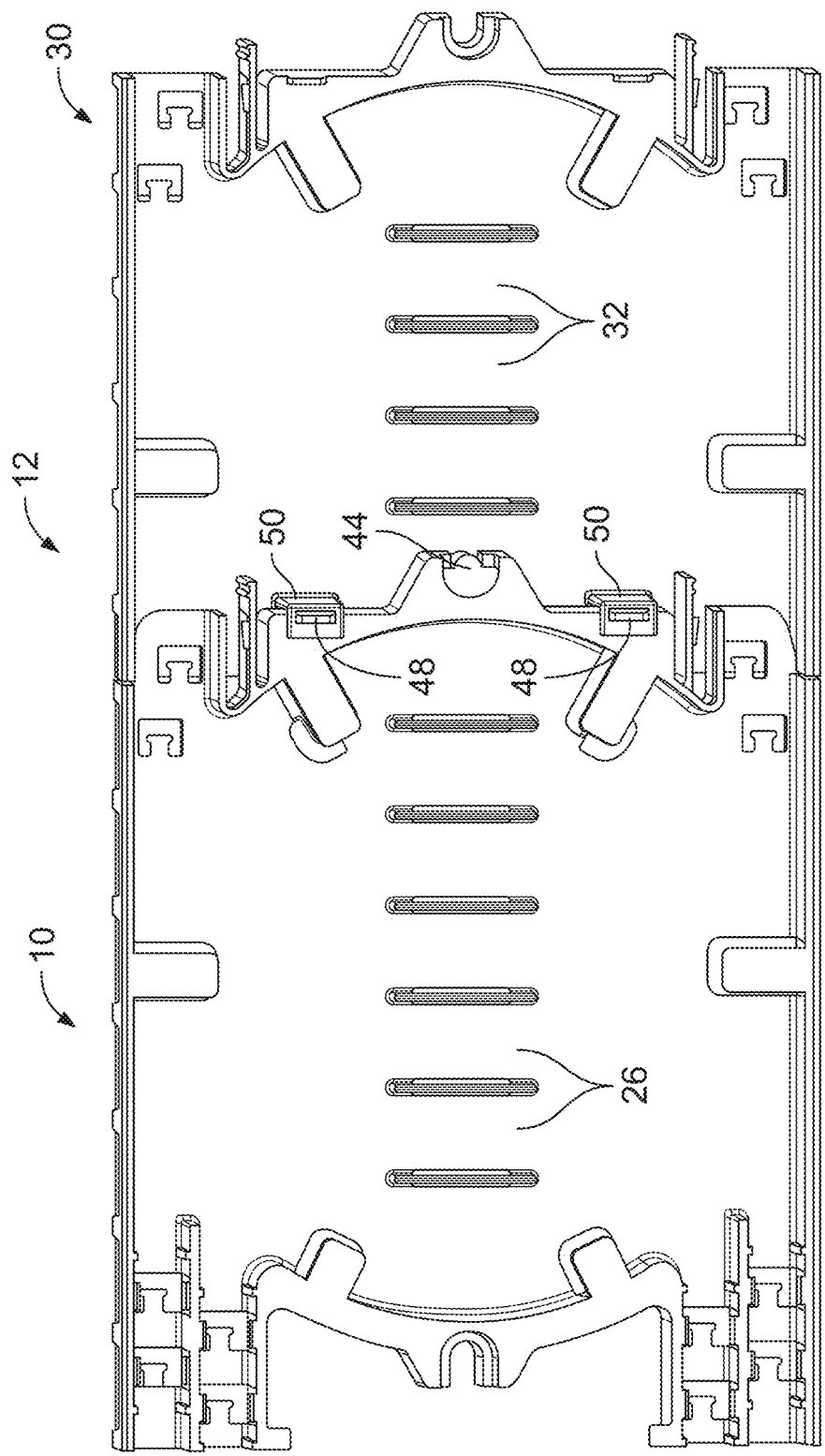
FIG. 5 is a plan view of the example first holder of FIG. 1 and the example second holder portion of FIG. 4 connected together in accordance with at least one aspect of the present disclosure.
Figure 6:
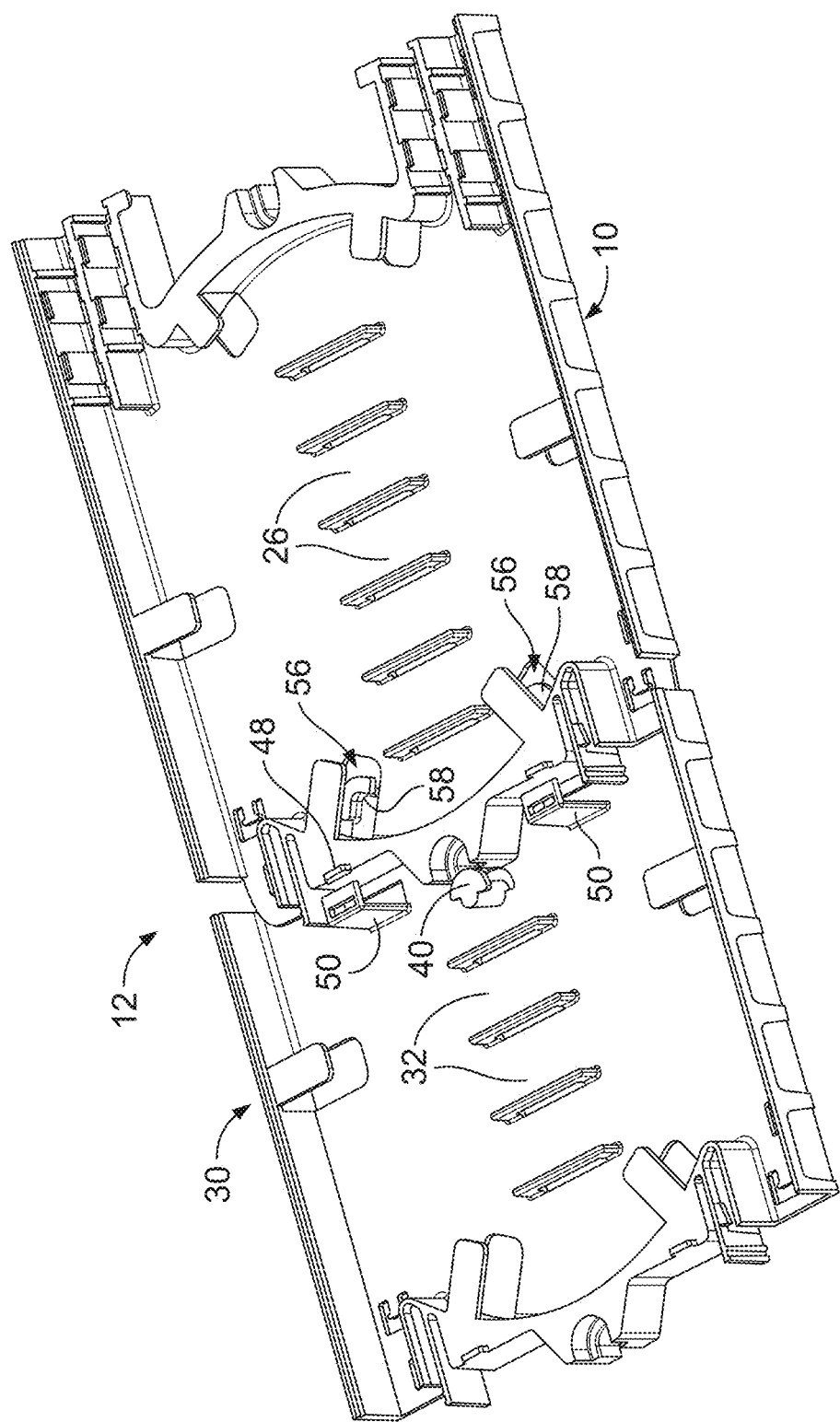
FIG. 6 is a reverse angle perspective view of the first holder portion and the second holder portion during an actuation that couples the first portion and the second portion together as is shown in FIG. 5.

Although it is contemplated that the first holder portion 10 may have a varied number of overall holder locations, at some point whatever number that is present may be less than what is currently needed/desired. It should be contemplated that there may be a need/desire to have more than the number (e.g., twenty for the example that would occur concerning FIGS. 1 and 3 or eighteen for the example concerning FIG. 2) of holder locations that are provided by the first holder portion 10 being the entire fiber-optic splice holder 12. Accordingly, attention is directed to FIG. 4, which shows a second holder portion 30 that is actuatable (e.g., see and compare FIGS. 5 and 6) with respect to the first holder portion 10 to provide a second, additional plurality of fiber-optic splice holding locations within the overall fiber-optic splice holder 12. To be clear, the second holder portion 30 may be added, combined, supplemented or the like to the first holder portion 10 so that both provide the overall fiber-optic splice holder 12.

It is to be appreciated that the term "actuatable" (and the family of related terms) is to be broadly interpreted. In general, there is to be some action that occurs for the second holder portion 30 relative to the first holder 10 portion. Such action may be varied. Some examples of such action are attachment, connection, movement or the like. Of course, such listed examples need not be limitations upon the present disclosure and that other, different actions are contemplated and within the scope of the present disclosure.

Focusing upon the shown example second holder portion 30 (FIG. 4), such example is configured to have/retain three of splice blocks 22 as indicated by the three spaces 32 for the splice blocks. With each splice block having four holder locations (e.g., the example of FIG. 3), a total of twelve holder locations may be provided by the second holder portion 30. Such is an example of a capacity (i.e., capable of holding twelve). So, the capacity of the example second holder portion 10 may be twelve. So, when the number of holder locations of the second holder portion 30 is added, combined, supplemented or the like to the number of holder locations of first holder portion 10 (i.e., when the first and second holder portions provide the overall fiber-optic splice holder 12), the total number of holder location that may be available for an example is thirty-two. Such is an example overall, total capacity (e.g., an example total capacity of thirty-two). Of course, it is to be appreciated that the capacity of the first holder portion 10, the capacity of the second holder portion 10 and thus the total capacity may be varied and such variations are within the scope of the present disclosure.

Turning to the actuation of the second holder portion 30 relative to the first holder portion 10 (see FIG. 6), the shown example has a series of interfitting segments at mating ends of the first and second holder portions 10, 30. Note that the interfitting segments are at one end of the first holder portion and a mating end of the second holder portion. Some of the interfitting segments of the shown example are a series of snap-lock segments.

Figure 7:
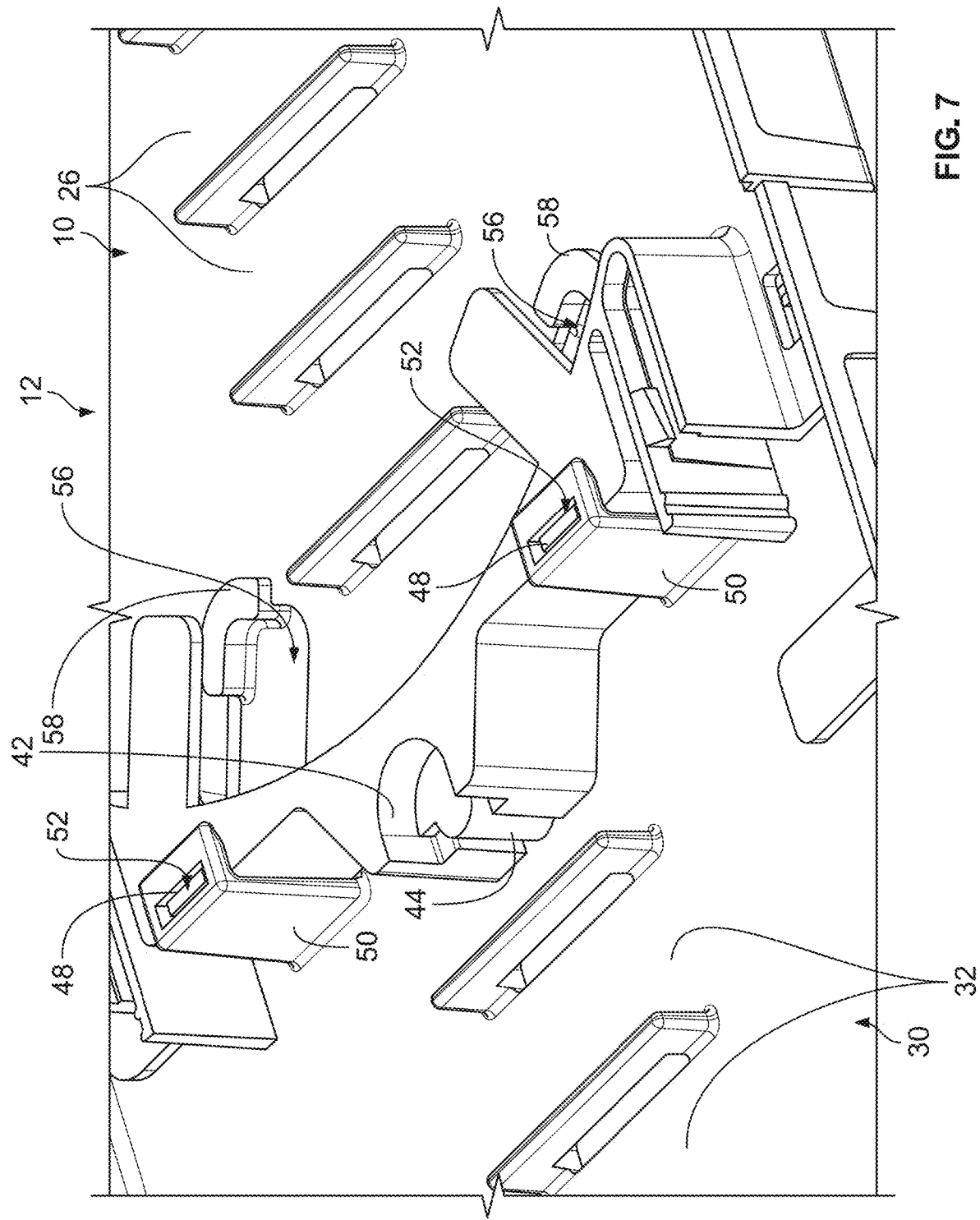
FIG. 7 is an enlarged, perspective view of a fragment of the overall content of FIG. 6, but with the first holder portion and the second holder portion after coupling together, and shows at least some segments that couple the first holder portion and the second holder portion together.
Figure 8:
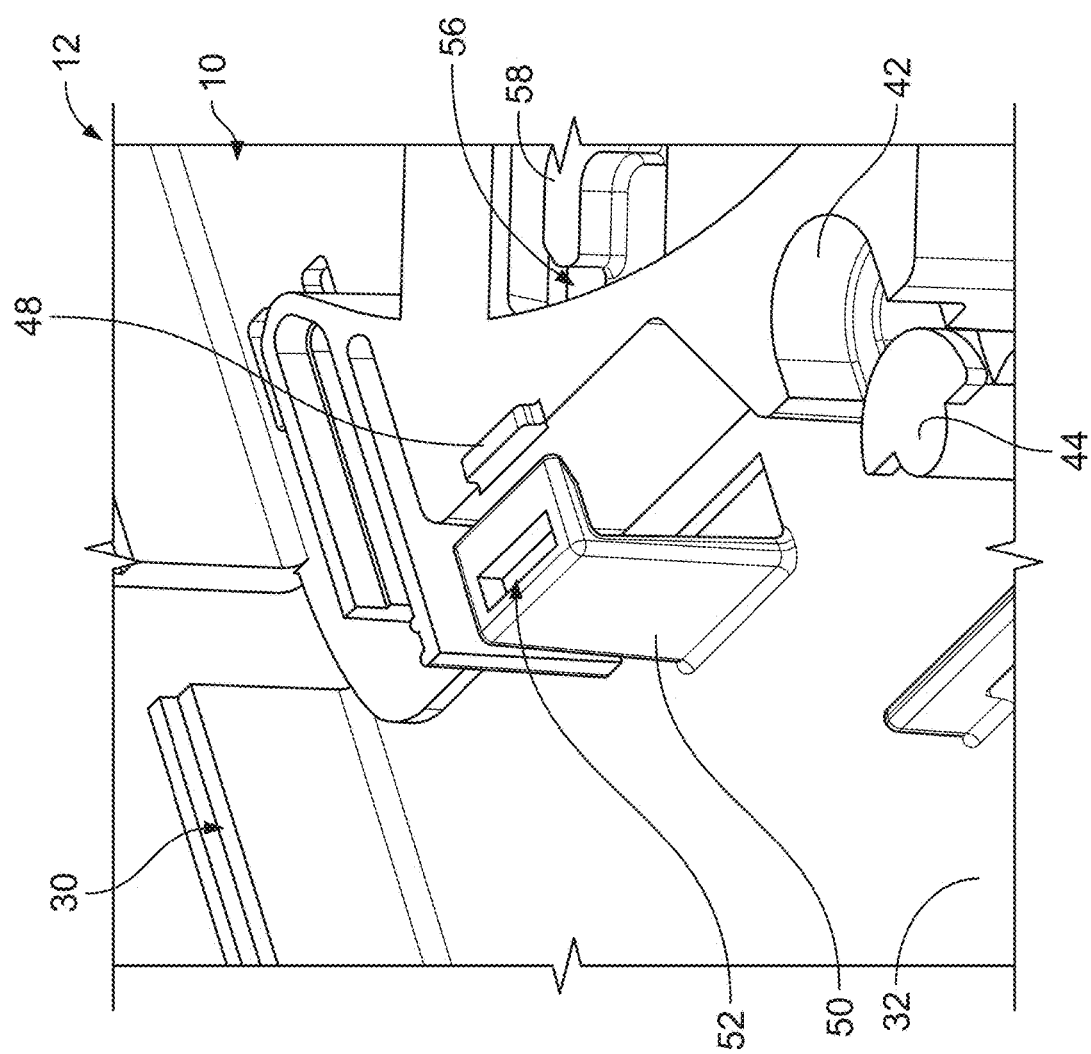
FIG. 8 is an enlarged, perspective view of a fragment of the overall content of FIG. 6 and shows at least some segments that couple the first holder portion and the second holder portion together during actuation, as is shown in FIG. 6, to couple the first holder portion and the second holder portion together.
Figure 9:
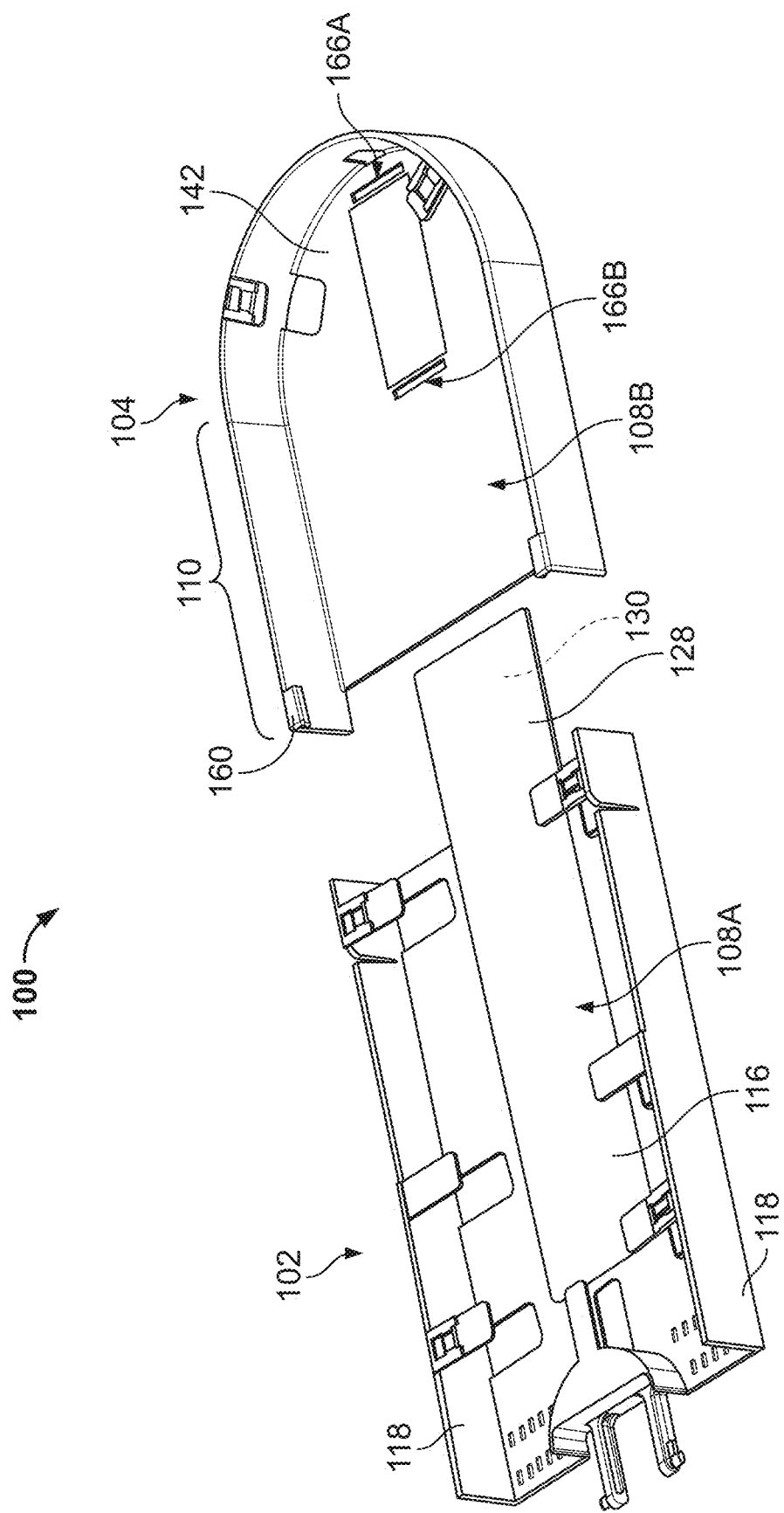
FIG. 9 is an exploded perspective view of another example of a first fiber-optic splice holder portion or "tray" and a second fiber-optic splice holder portion in accordance with at least one aspect of the present disclosure.
Figure 10:
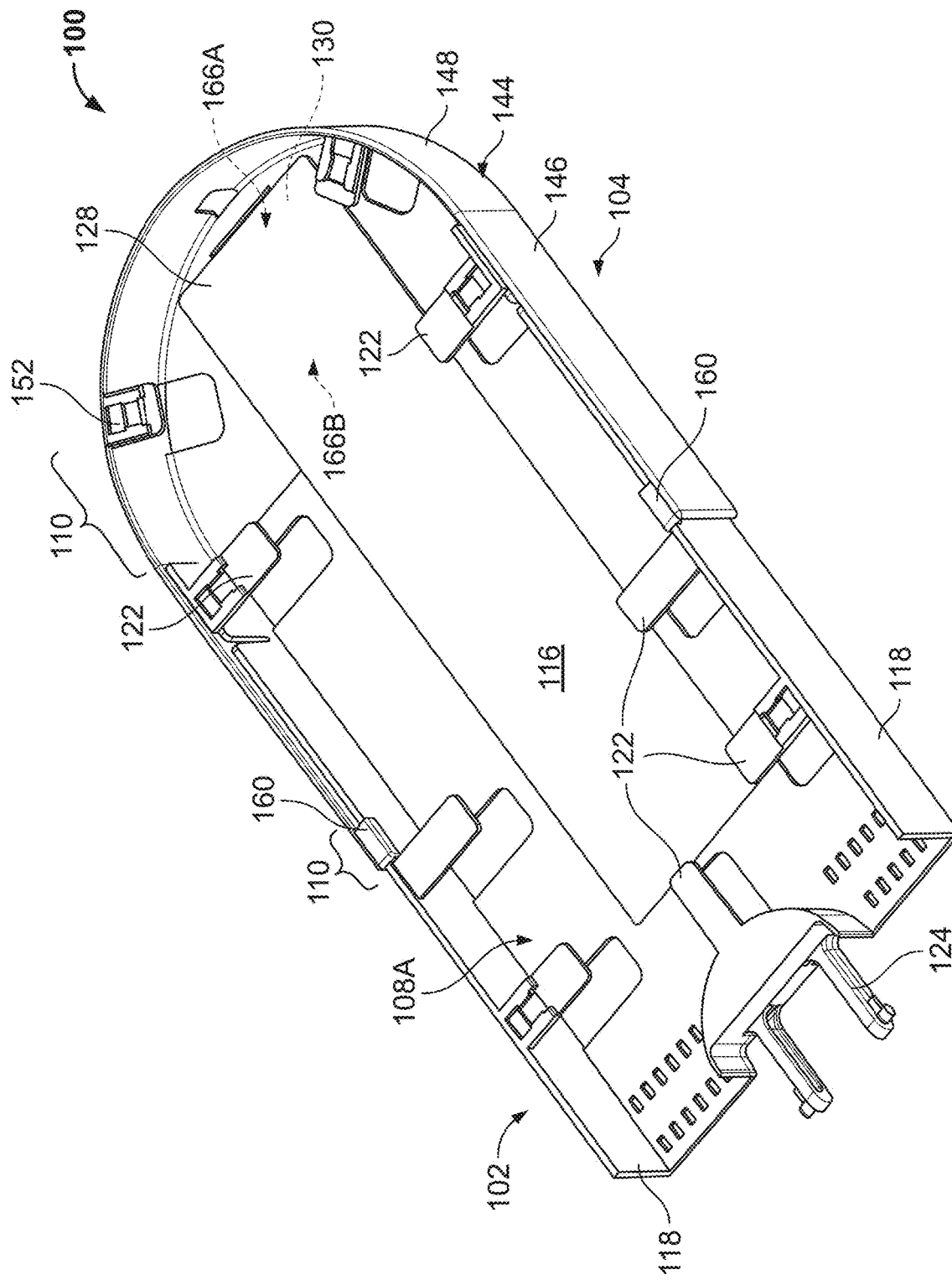
FIG. 10 is a perspective view of the first holder portion and the second holder portion of FIG. 9 in a first, telescoped-in position.

As an example of the interfitting segments on the mating ends (see FIGS. 6-8), note that the first holder portion 10 has a segment that provides a receptacle 42 and the second holder portion 30 has a segment that is a post 44. The post 44 may be received within the receptacle 42 to help retain the second holder portion 30 relative to the first holder portion 10.

Also within the shown example regarding interfitting segments, the first holder portion 10 includes a plurality (e.g., two) projections 48 and the second holder portion 30 includes a corresponding number of fingers 50, with each finger having an aperture 52 to receive a respective one of the projections 48 of the first holder portion 10. The fingers 50 have some amount of resiliency so as to elastically deform during an actuation (e.g., connection movement of the second holder portion 30 to the first holder portion 10). Once the respective projection 48 reaches the aperture 52 of the respective finger 50, the finger returns to an undeformed condition. Such return to undeformed condition may be sudden, snap-like movement and thus is terms a "snap-fit" connection. Each respective projection 48 and finger 50 provides a snap-fit connection. Thus, there are two projection 48 and finger 50 snap-fit connections. The two snap-fit connections help retain the second holder portion 30 relative to the first holder portion 10.

Also with the shown example regarding interfitting segments, the first holder portion 10 includes segments that provide a plurality (e.g., two) of apertures 56 and the second holder portion 30 includes a corresponding number of segments that provide overlap fingers 58. Each overlap finger 58 is received in a respective one of the apertures 56 of the first holder portion 10. When the second holder portion 30 is fully actuated to the first holder portion 10 (e.g., the second holder portion is fully and finally seated into a final engagement against the first holder portion), each overlap finger 58 extends through the respective aperture 56 on the first holder portion 10 and at least some of each overlap finger overlaps at least some of the first holder portion adjacent to the respective aperture. The two overlap fingers 58 help retain the second holder portion 30 relative to the first holder portion 10.

It is to be appreciated that within the shown example each of the example interfitting segments simultaneously reach their respective final respective positions as the second holder portion 30 is fully actuated to the first holder portion 10 (e.g., the second holder portion is fully and finally seated into a final engagement against the first holder portion). As an aid to understanding such, please compare FIGS. 6 and 8, which show relative positions during actuation but prior to reaching full actuation, to FIGS. 5 and 7, which show relative positions once full actuated (e.g., the second holder portion 30 is fully and finally seated into a final engagement against the first holder portion 10) is achieved.

It is to be noted that the second holder portion may have a series of segments at a distal end that mimic the series of segments just discussed at the mating of for the first holder segment. As such the distal end of the second holder portion mimics the mating end of the first holder portion. It is to be appreciated that with the second holder portion seated into a final engagement against the first holder portion, such second holder portion may be considered to be an initial second holder portion. If another second holder portion is seated into a final engagement against the initial second holder portion, due to the distal end of the initial second holder portion mimicking the first holder portion, such other second holder portion may be considered to be a subsequent second holder portion. With the actuation/addition of the subsequent second holder portion, another group of holder locations 24 is provided. As such, the overall, total capacity may be increased repeatedly. Within an example, the overall, total capacity may be at least doubled as compared to the capacity of just a first holder segment. Of course, any increase amount is contemplated and within the scope of the present disclosure.

If the subsequent second holder portion also has a distal end that mimics the mating end of the first holder portion, yet another (i.e., third of the sequence) of the second holder portions may be added. With the actuation/addition of each subsequent second holder portion, another group of holder locations 24 is provided. It is to be appreciated that the number of subsequent second holder portions actuated/ added may continue to work toward a needed/desired about of holder locations 24 and/or until available space within an associated container or similar is reached.

As mentioned above, an aspect of the present disclosure is that the additional holder portion(s) may be actuated so that an overall fiber-optic splice holder has more (i.e., additional) holder portion(s). It is to be appreciated that the examples discussed above are simply examples and that variants are possible, contemplated and within the scope of the present disclosure. Also, it is to be recalled that the aspect of actuation of additional holder portion(s) is to be broadly interpreted. So, different types of actuation are possible, contemplated and within the scope of the present disclosure. An example of such different type of actuation is provide via the example fiber-optic splice holder 100 shown with FIGS. 9-14.

The holder 100 includes a first holder portion 102 and a second holder portion 104. Each of the first and second holder portions 102, 104 may be configured/constructed to provide holder locations. See the general areas 108A, 108B which may be for holder locations. Within an example, each of the first and second holder portions 102, 104 may utilize one or more splice block(s) (e.g., item 22 of FIG. 3) to provide the multiple holder locations. Of course, it is to be understood that such is just an example and that variations are possible, contemplated and within the scope of the present disclosure. As such, the first and second holder portions 102, 104 are shown with generic areas 108A, 108B for holder locations to help indicate that variations are possible.

Figure 11:
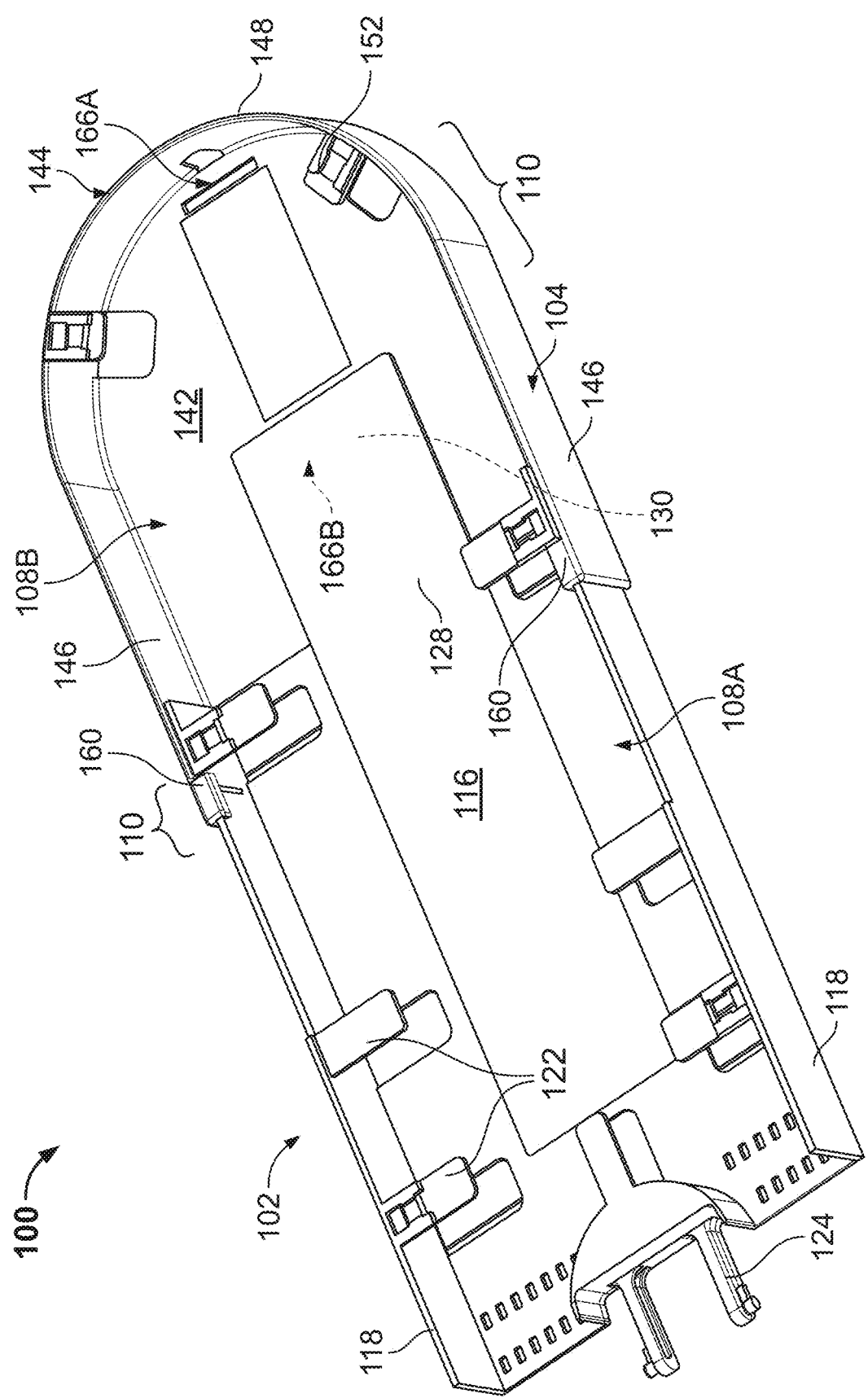
FIG. 11 is a perspective view similar to FIG. 9, but with the first holder portion and the second holder portion in a second, telescoped-out position.

The first and second holder portions 102, 104 are coupled together with a coupling 110 (locations generally referenced within the exploded view of FIG. 9) such that the first and second holder portions are relatively moveable to each other and such relative movement may be associated with actuated so that the holder 100 may provide more (i.e., additional) holder portion(s). Within the shown example, the relative movement includes a relative sliding movement. Accordingly, the first and second holder portions 102, 104 have cooperating structures to provide for the sliding movement. The first and second holder portions 102, 104 are relatively slidable between a first, telescoped-in position (FIG. 10) and a second, telescoped-out position (FIG. 11).

Focusing upon the first holder portion 102, the first holder portion has a general rectangular shape. The first holder portion 102 has a planar back wall 116 and two side walls 118. The back wall 116 provides an area for the multiple holder locations, see generic areas 108A, which are mentioned above. The two side walls 118 are at opposite sides of the back wall 116. Each of the two side walls 118 is perpendicular to the back wall 116 and extend along a length extent of the back wall. A major width of the first holder portion is measured between the outer side of the two side walls 188.

One or more line guides, retainers or the like, generally identified as 122, are provided on the first holder portion 102. Within the shown example the guides, retainers or the like 122 are located at the side walls 118. However, other constructions/configurations are possible. Also, one or more structures 124 for attachment of the first holder portion 102 to other related items/structures may be provided. Within the shown example the structure(s) 124 for attachment is located at a bottom of the back wall 116. However, other constructions/configurations are possible.

At an end proximate to the second holder portion 104, the first holder portion 102 includes a tongue 128. The tongue 128 is within the same plane as the back wall 116. The tongue 128 has a width that is less than the major width of the first holder portion 102. A projection 130 (e.g., seen in FIGS. 12-14) extends transversely from the tongue 128. The projection 130 is hidden from view within some of the figures, and as such is shown via the use of a reference line indicating hidden structure for such figures. The projection 130 is at least part of the coupling 110 that connects the second holder portion 104 to the first holder portion 102.

Turning to the second holder portion 104, the second holder portion has a general horseshoe shape. The second holder portion 104 has a planar back wall 142 and a boundary wall 144 that extends in a general horseshoe shape around a periphery of the back wall 142. Specifically, the boundary wall has two side wall segments 146 and an arcuate segment 148 at a top connecting the two side wall segments 146. The boundary wall 144 is perpendicular to the back wall 142. The two side wall segments 146 are at opposite sides of the back wall 142.

A major width of the second holder portion 104 is measured between the outer side of the two side wall segments 146. It is to be noted that the major width of the second holder portion 104 is slightly greater than the major width of the first holder portion 102. As such the side walls 118 of the first holder portion 102 fit inside (i.e., nest within) the two side wall segments 146 of the second holder portion 104.

The back wall 142 provides an area (e.g., area 108B) for the multiple holder locations that are mentioned above. One or more line guides, retainers or the like, generally 152, are provided on the second holder portion 104. Within the shown example the guides, retainers or the like 152 are located at the arcuate segment 148. However, other constructions/configurations are possible.

At an end proximate to the first holder portion 102, the second holder portion 104 includes at least one retainer 160 for holding and guiding the first holder portion during relative movement of the first and second holder portions. The at least one retainer 160 is at least part of the coupling 110 that connects the second holder portion 104 to the first holder portion 102. Within the shown example, the second holder portion 104 includes two retainers 160, with one retainer being located on each of the two side wall segments 146.

Each retainer 160 is a hook-like segment that hooks over an edge of an associated/adjacent side wall 118 of the first holder portion 102. As the first and second holder portions 102, 104 relatively move (e.g., slide), the retainers 160 slide along the edges of the side walls 118. The retainers 160 allow such relative sliding movement, but the retainers prevent separation of the first and second holder portions 102, 104. It is to be noted that within the shown example, some of the line guides, retainers or the like 122 on the first holder portion 102 also function as stops to bound the relative sliding range of the first and second holder portions 102, 104.

The second holder portion 104 includes a plurality of apertures 166A, 166B in the back wall 142 of the second holder portion. Within the shown example, two apertures, a first aperture 166A and a second aperture 166B, are present. See that within FIGS. 9, 12 and 14 the two apertures 166A, 166B are visible. Note that the apertures 166A, 166B are hidden within FIG. 10 and are thus indicated by the use of the hidden-indicating lead lines. Also note that the aperture 166B is hidden within FIG. 11 and are thus indicated by the use of the hidden-indicating lead line.

The tongue 128 of the first holder portion 102 is insertable into each one of the apertures 166A, 166B. Each aperture 166A, 166B is approximately the same size (i.e., length and width) as the projection 130 on the tongue 128 of the first holder portion 102. Within an example each aperture 166A, 166B is sized such that there is some resistance to insertion/extraction of the projection 130 into/out of each aperture 166A, 166B. Thus, a friction fit, or similar, occurs upon insertion of the projection 130 into each one the first or second apertures 166A, 166B.

Figure 12:
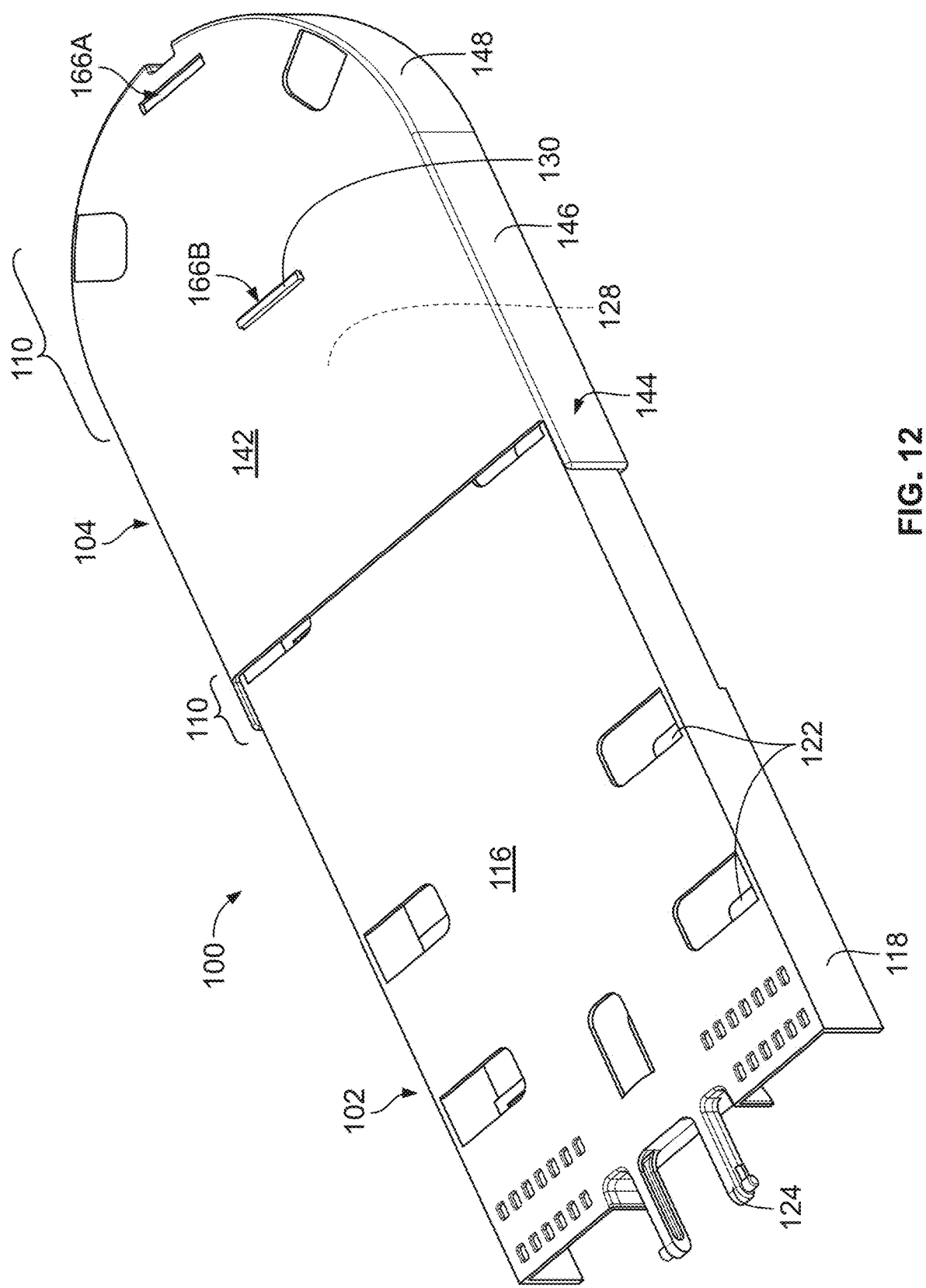
FIG. 12 is a reverse angle perspective view, which is a view in the opposite direction compared to FIG. 11.
Figure 13:
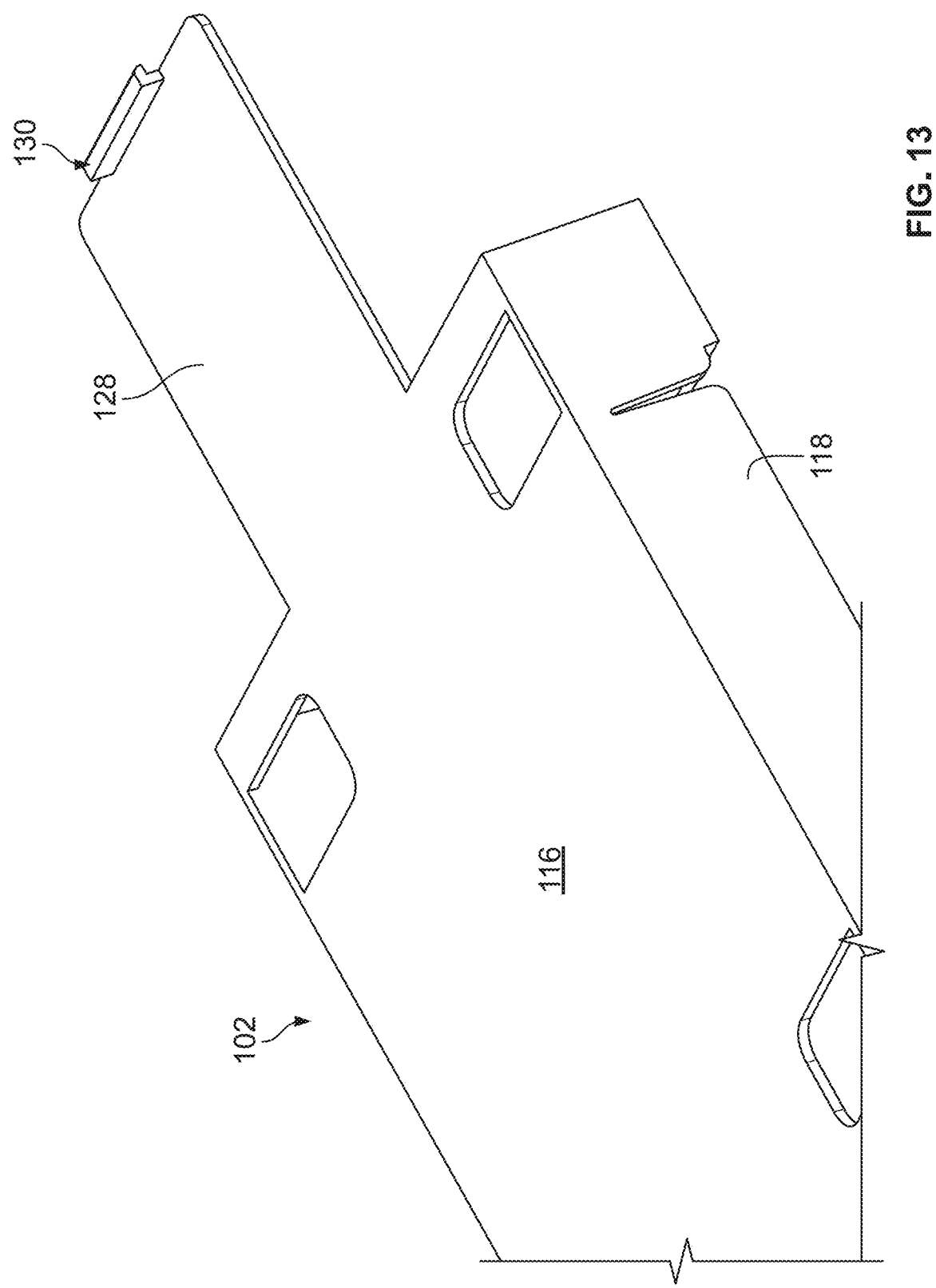
FIG. 13 is an enlarged, partially torn away view of just the first holder portion as viewed within FIG. 12.
Figure 14:
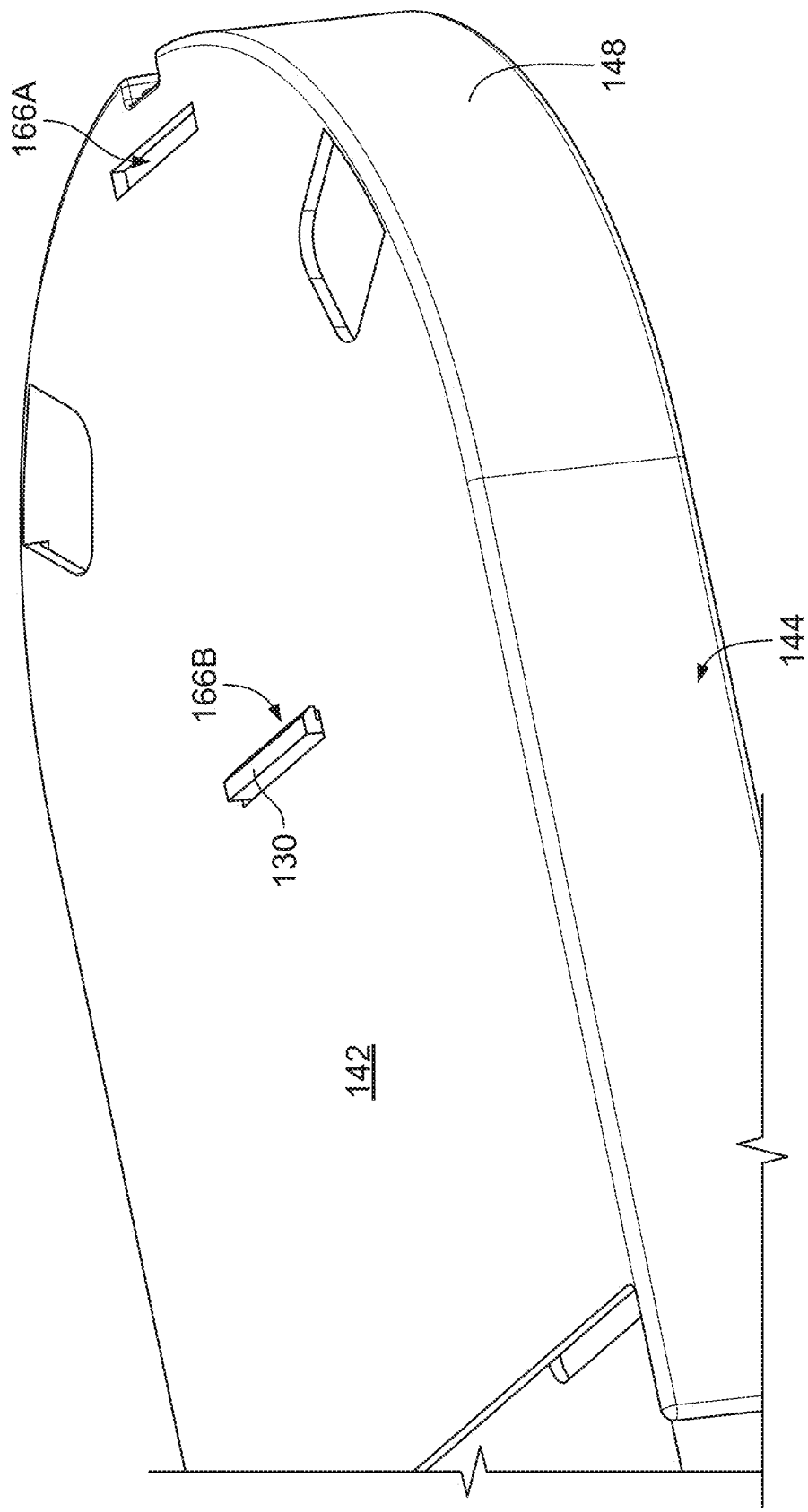
FIG. 14 an enlarged, partially torn away view of the view shown in FIG. 12.

The first and second apertures 166A, 166B are located on the back wall 142 of the second holder portion such that the projection is aligned within the first aperture when the first and second holder portions are in the first, telescoped-in position (FIG. 10) and the projection is aligned within the second aperture when the first and second holder portions are in the second, telescoped-out position (FIGS. 11, 12 and 14). Moreover, the projection may be inserted, albeit with some possible resistance, into the first aperture when the first and second holder portions are in the first, telescoped-in position (FIG. 10) and the projection may be inserted, albeit with some resistance, into the second aperture when the first and second holder portions are in the second, telescoped-out position (FIGS. 11, 12 and 14). The projection, the first and second apertures, and the insertion of the projection into such may be part of the coupling for connecting the second holder portion to the first holder portion.

Although the areas 108A, 108B are shown as being generic, it is to be appreciated that each of the areas 108A, 108B may have an associated capacity. Accordingly, the capacity of the area 108A and the capacity of the area 108B provide an overall, total capacity. Of course, it is to be appreciated that the capacity of the area 108A, the capacity of the area 108B and thus the overall, total capacity may be varied and such variations are within the scope of the present disclosure. Within an example, the addition of the capacity of the area 108B to the capacity of the area 108A at least doubles the overall, total capacity.

It is to be appreciated that an aspect of the present disclosure is that overall capacity (e.g., number of spaces, number of splice blocks, number of holder locations, etc.) for lines is increased. The amount of increase may vary the particulars of the components, the number of components, etc. Within an example, the utilization of an additional (i.e., second) holder portion, the overall capacity may be at least doubled. Of course, doubling the capacity need not be a specific limitation, and different capacity increases are within the scope of the present disclosure. Also of course, use of multiple additional holder portions provide commensurate additional capacity increases.

It is to be appreciated that an aspect of the present disclosure is that increase(s) in capacity enables scalability. Moreover, increase(s) in capacity, in accordance with an aspect of the present disclosure, provides for such scalability without re-splicing or re-traying existing lines/splice points.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising."

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A fiber-optic splice holder, comprising:
a first holder portion comprising a first fiber-optic splice holding location and having a first length along which the first fiber-optic splice holding location is situated;
a second holder portion actuatable with respect to the first holder portion and comprising a second fiber-optic splice holding location and having a second length along which the second fiber-optic splice holding location is situated; and
a coupling for connecting the second holder portion in an engagement to the first holder portion via cooperating contact engagement structures of the first and second holder portions to place the second length of the second holder portion in series with the first length of the first holder portion such that the second fiber-optic splice holding location is in a linear progression from the first fiber-optic splice holding location.

2. The holder as set forth in claim 1, wherein the coupling comprises at least one of a first interfitting segment on the first holder portion or a second interfitting segment on the second holder portion.

3. The holder as set forth in claim 2, wherein at least one of the first interfitting segment comprises a first snap-fit segment or the second interfitting segment comprises a second snap-fit segment.

4. The holder as set forth in claim 2, wherein the first interfitting segment comprises a post and the second interfitting segment comprises a receptacle.

5. The holder as set forth in claim 2, wherein the first interfitting segment comprises a projection and the second interfitting segment comprises an aperture.

6. The holder as set forth in claim 5, wherein the aperture is defined within a resilient finger.

7. The holder as set forth in claim 2, wherein the first interfitting segment comprises an aperture and the second interfitting segment comprises an overlapping finger.

8. The holder as set forth in claim 1, wherein the first holder portion provides a first splice capacity amount, the second holder portion provides a second splice capacity amount, and the first splice capacity amount and the second splice capacity amount providing a combined total splice capacity amount.

9. The holder as set forth in claim 8, wherein the combined total splice capacity amount is at least double the first splice capacity amount.

10. A fiber-optic splice holder, comprising:
a first holder portion comprising a first fiber-optic splice holding location;
a second holder portion actuatable with respect to the first holder portion and comprising a second fiber-optic splice holding location; and
a coupling for connecting the second holder portion in an engagement to the first holder portion via cooperating contact engagement structures of the first and second holder portions, wherein the first holder portion and the second holder portion are slidable relative to one another, and the holder comprises at least one of a first segment on the first holder portion to guide the relative sliding or a second segment on the second holder portion to guide the relative sliding.

11. The holder as set forth in claim 10, wherein the coupling comprises at least one of a first interfitting segment on the first holder portion or a second interfitting segment on the second holder portion.

12. The holder as set forth in claim 11, wherein the first interfitting segment comprises a projection and the second interfitting segment comprises an aperture.

13. The holder as set forth in claim 11, wherein at least one of the first interfitting segment comprises a first snap-fit segment or the second interfitting segment comprises a second snap-fit segment.

14. A fiber-optic splice holder, comprising:
a first holder portion comprising a first fiber-optic splice holding location and having a first length along which the first fiber-optic splice holding location is situated, wherein the first holder portion is actuatable with respect to a second holder portion comprising a second fiber-optic splice holding location and having a second length along which the second fiber-optic splice holding location is situated; and
a coupling for connecting the first holder portion in an engagement to the second holder portion via cooperating contact engagement structures of the first and second holder portions to place the second length of the second holder portion in series with the first length of the first holder portion such that the second fiber-optic splice holding location is in a linear progression from the first fiber-optic splice holding location.

15. The holder as set forth in claim 14, wherein the coupling comprises a first interfitting segment on the first holder portion.

16. The holder as set forth in claim 14, wherein the first holder portion provides a first splice capacity amount, the second holder portion provides a second splice capacity amount, and the first splice capacity amount and the second splice capacity amount providing a combined total splice capacity amount.

17. The holder as set forth in claim 16, wherein the combined total splice capacity amount is at least double the first splice capacity amount.

18. A fiber-optic splice holder, comprising:
a first holder portion comprising a first fiber-optic splice holding location, wherein the first holder portion is actuatable with respect to a second holder portion comprising a second fiber-optic splice holding location; and
a coupling for connecting the first holder portion in an engagement to the second holder portion via cooperating contact engagement structures of the first and second holder portions, wherein the first holder portion is slidable relative to the second holder portion, and the holder comprises a first segment on the first holder portion to guide the relative sliding.

19. The holder as set forth in claim 18, comprising:
the second holder portion.

20. The holder as set forth in claim 19, comprising:
a second segment on the second holder portion to guide the relative sliding.

21. The holder as set forth in claim 18, wherein the coupling comprises:
a first interfitting segment on the first holder portion; and
a second interfitting segment on the second holder portion.

22. A fiber-optic splice holder, comprising:
a first holder portion comprising a first fiber-optic splice holding location, wherein the first holder portion is slidingly coupled to a second holder portion via cooperating structures of the first and second holder portions so as to be telescopingly slidable with respect to the second holder portion comprising a second fiber-optic splice holding location; and
a first segment on the first holder portion engaged with the second holder portion to guide the relative sliding.

23. The holder as set forth in claim 22, comprising:
the second holder portion.

24. The holder as set forth in claim 23, comprising:
a second segment on the second holder portion to guide the relative sliding.

25. The holder as set forth in claim 22, wherein the first holder portion provides a first splice capacity amount, the second holder portion provides a second splice capacity amount, and the first splice capacity amount and the second splice capacity amount providing a combined total splice capacity amount.

26. The holder as set forth in claim 25, wherein the combined total splice capacity amount is at least double the first splice capacity amount.

* * * * *